US008428786B2

(12) United States Patent
Milazzo et al.

(10) Patent No.: US 8,428,786 B2
(45) Date of Patent: Apr. 23, 2013

(54) DYNAMIC RESOURCE LOAD REDUCTION

(75) Inventors: Cedar Milazzo, San Jose, CA (US); Ashish Umrani, Dublin, CA (US)

(73) Assignee: 4Home, Inc., Sunnyvale, CA (US)

( * ) Notice: Subject to any disclaimer, the term of this patent is extended or adjusted under 35 U.S.C. 154(b) by 299 days.

(21) Appl. No.: 12/711,026

(22) Filed: Feb. 23, 2010

(65) Prior Publication Data
US 2011/0208368 A1    Aug. 25, 2011

(51) Int. Cl.
*G05D 11/00*    (2006.01)

(52) U.S. Cl.
USPC ................. 700/295; 705/412; 707/770

(58) Field of Classification Search .......... 700/286, 700/295; 705/412; 707/770
See application file for complete search history.

(56) References Cited

U.S. PATENT DOCUMENTS

| | | | |
|---|---|---|---|
| 6,671,586 B2* | 12/2003 | Davis et al. | 700/295 |
| 7,130,719 B2* | 10/2006 | Ehlers et al. | 700/276 |
| 7,379,997 B2* | 5/2008 | Ehlers et al. | 709/224 |
| 2004/0139038 A1* | 7/2004 | Ehlers et al. | 705/412 |
| 2005/0033707 A1* | 2/2005 | Ehlers et al. | 705/412 |
| 2007/0043478 A1* | 2/2007 | Ehlers et al. | 700/276 |
| 2009/0157529 A1* | 6/2009 | Ehlers et al. | 705/26 |
| 2010/0250590 A1* | 9/2010 | Galvin | 707/770 |

* cited by examiner

*Primary Examiner* — Mohammad Ali
*Assistant Examiner* — Anthony Whittington
(74) *Attorney, Agent, or Firm* — Susan R. Payne

(57) ABSTRACT

In one embodiment, a method determines an area for a load reduction of resources. Statistics regarding a past history of load reductions for a plurality of consumers in the area is then determined. Load reduction ratings for the plurality of consumers based on the statistics is then determined. The load reduction rating may be used to rank the consumers based on the result of past load reductions. A list of consumers and devices is then determined for the load reduction. For example, consumers and associated devices are selected based on their load reduction rating. The amount of savings is calculated to be equal to an amount of load reduction that is desired. A signal requesting a load reduction is then sent for the determined consumers and devices.

22 Claims, 5 Drawing Sheets

US 8,428,786 B2

DYNAMIC RESOURCE LOAD REDUCTION

BACKGROUND

Particular embodiments generally relate to resource demand reduction.

Utility companies and other distribution organizations (referred hereinafter as "utilities") are responsible for supplying a reliable supply of resources (e.g., electricity, gas, or water) to their customers. One difficulty utilities have is matching the supply of resources to the demand for the resources. The failure to match the provided resources to the demand may result in undesirable consequences.

The utilities may either increase production or reduce demand to match the supply of resources to the demand. The utilities may reduce the demand by powering down or shutting off devices in certain homes. For example, when demand is considered high, a group of devices may be powered down. One problem with this method is that the groups of devices are static because the devices may be manually configured to be shut off as a group. Once the group is manually configured, reconfiguration of the groups of devices may be burdensome. Also, after powering down or shutting off devices, users may turn these devices back on. This lessens the effectiveness of the load reduction if users continually reject the load reduction. In addition, because the groups are static, devices are continually powered down or shut off even though a user may not be complying with the load reduction.

SUMMARY

Particular embodiments generally relate to load reduction. In one embodiment, a method determines an area for a load reduction of resources. Statistics regarding a past history of load reductions for a plurality of consumers in the area are then determined. A load reduction rating for the plurality of consumers based on the statistics may be used to rank the consumers based on the result of past load reductions. For example, the rating may take into account how often consumers responded negatively to a load reduction request, an amount of savings that occurred for consumers in a prior load reduction request, and also a number of requests that consumers have participated in recent history. A list of consumers and devices is then determined for the load reduction. For example, consumers and associated devices are selected based on the load reduction ratings. The amount of savings is calculated to be equal to an amount of load reduction that is desired. A signal requesting a load reduction is then sent for the determined consumers and devices.

In one embodiment, a method is provided comprising: determining an area for a load reduction of resources; determining statistics regarding a past history of load reductions for a plurality of consumers in the area; determining load reduction ratings for the plurality of consumers based on the statistics regarding the past history of load reductions; determining, using a computing device, a list of consumers and devices for a load reduction based on an analysis of the load reduction ratings for the plurality of consumers, the determined devices associated with the consumers in the list; and sending a signal requesting a load reduction for the determined devices for the list of consumers.

In another embodiment, a method is provided comprising: receiving, at a device controller, a load reduction request from a computing device, the load reduction request for a device in communication with the device controller, wherein a consumer and the device were determined for the load reduction based on a past history of load reductions for the consumer; communicating with the device to power down or turn off the device; collecting statistics regarding resource usage for the device after the powering down or turning off of the device; and sending the statistics to a statistics collector for use in determining consumers in a future load reduction.

In another embodiment, an apparatus is provided comprising: one or more computer processors; and logic encoded in a computer readable storage medium, the logic when executed by the one or more computer processors operable to: determine an area for a load reduction of resources; determine statistics regarding past history of load reductions for a plurality of consumers in the area; determine load reduction ratings for the plurality of consumers based on the statistics regarding the past history of load reductions; determine a list of consumers and devices for a load reduction based on an analysis of the load reduction ratings for the plurality of consumers, the determined devices associated with the consumers in the list; and send a signal requesting a load reduction for the determined devices for the list of consumers.

The following detailed description and accompanying drawings provide a better understanding of the nature and advantages of the present invention.

DETAILED DESCRIPTION

Described herein are techniques for resource load reduction. In the following description, for purposes of explanation, numerous examples and specific details are set forth in order to provide a thorough understanding of embodiments of the present invention. Particular embodiments as defined by the claims may include some or all of the features in these examples alone or in combination with other features described below, and may further include modifications and equivalents of the features and concepts described herein.

Figure 1:
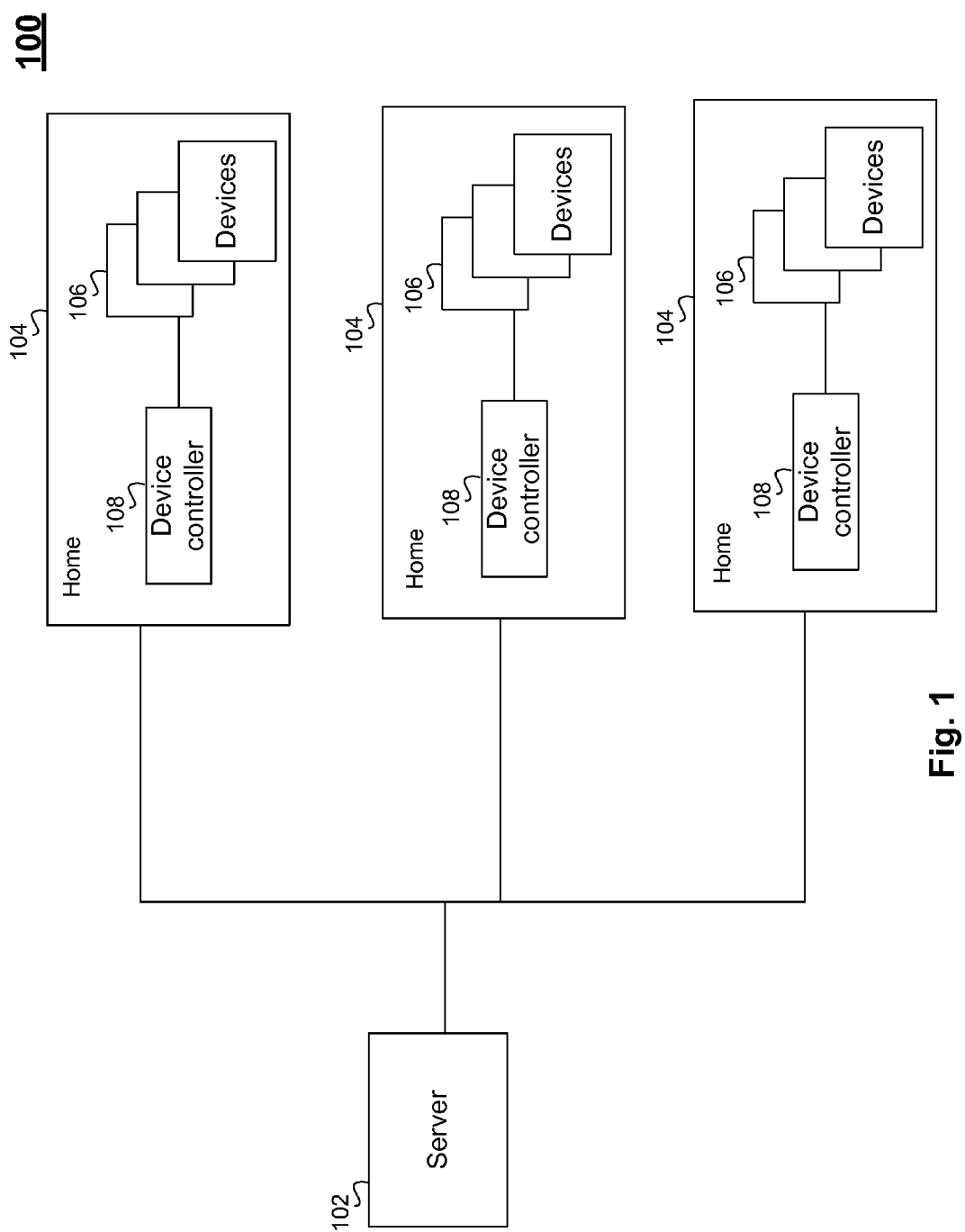
FIG. 1 depicts an example system for providing load reduction according to one embodiment.

FIG. 1 depicts an example system 100 for providing load reduction according to one embodiment. System 100 includes a server 102 and a plurality of homes 104.

Particular embodiments are related to the load reduction of resources. A resource may be electricity, water, or gas. Other resources that are consumed by devices 106 may also be reduced in a load reduction. Server 102 may be associated with a utility company or distribution organization, or may be a third party that is providing a service to the utility. Any of these entities are hereinafter referred to as a utility. The utility is an organization that provides resources to homes 104. The utility attempts to match the supply of the resource to the demand. At some points when the demand is more than the supply, the utility may attempt to reduce the demand. This may be referred to as a load reduction event. A load reduction event powers down or turns off devices 106. In powering down device 106, the amount of resources used by device 106 is reduced. Also, by turning off device 106, the device is powered off such that a minimal amount of resources is used.

In both cases device 106 is converted to a state that uses less resources than the device is currently using.

Homes 104 may be any place that includes devices 106 that may be using resources. For example, home 104 may be a residential home, apartment, condominium, a retail business, a commercial building, or other buildings. A home 104 may be associated with a user. For example, a user may be someone who is living in home 104.

Home 104 includes a device controller 108. Device controller 108 may be a standalone device, or integrated with other functionality such as an advanced metering infrastructure (AMI) smart meter, a set-top box, or a broadband home router. Device controller 108 may be able to automatically devices 106. For example, device controller 108 may automatically turn on, turn off, and/or power down devices 106. Device controller 108 may also perform other actions, such as controlling the operation of devices 106 (e.g., automatically causing the playing of a DVD on a DVD player). In one example, device controller 108 is connected to devices 106 through a local area network (LAN) or home area network. Device controller 108 communicates with devices 106 though the network to power down or turn off the devices. Although device controller 108 is described as being inside home 104, device controller 108 may be found outside of home 104. For example, device controller 108 may be found in a central office and communicates with devices 106 though a network, such as a wide area network (WAN).

Server 102 is a computing device that is used to determine which devices 106 in certain homes 104 to reduce the resources being used. For example, server 102 uses the statistics from past histories of load reduction events to determine a list of devices 106 to power down or turn off in certain homes 104.

As will be described in more detail below, particular embodiments collect information from devices 106 in homes 104 during past load reduction events. This information is used to rank consumers for a possible load reduction. As used herein, the term consumer will be used. A consumer may be a general term that identifies an entity that is ranked. For example, the consumer may be a user, a home, or a grouping of devices 106. The consumer may be associated with a group of one or more devices 106.

When a utility determines that a load reduction is required, consumers may be ranked. Devices 106 are then selected for consumers to be powered down or off. The selection is based on the statistics of the history of past load reduction events. By using the statistics from past load reduction events, consumers and devices 106 that are selected may be more likely to yield a better load reduction. For example, it may be more likely that a user will not turn on a device 106 after it has been powered down or turned off, or the selected devices 106 may yield a better savings of resources.

Figure 2:
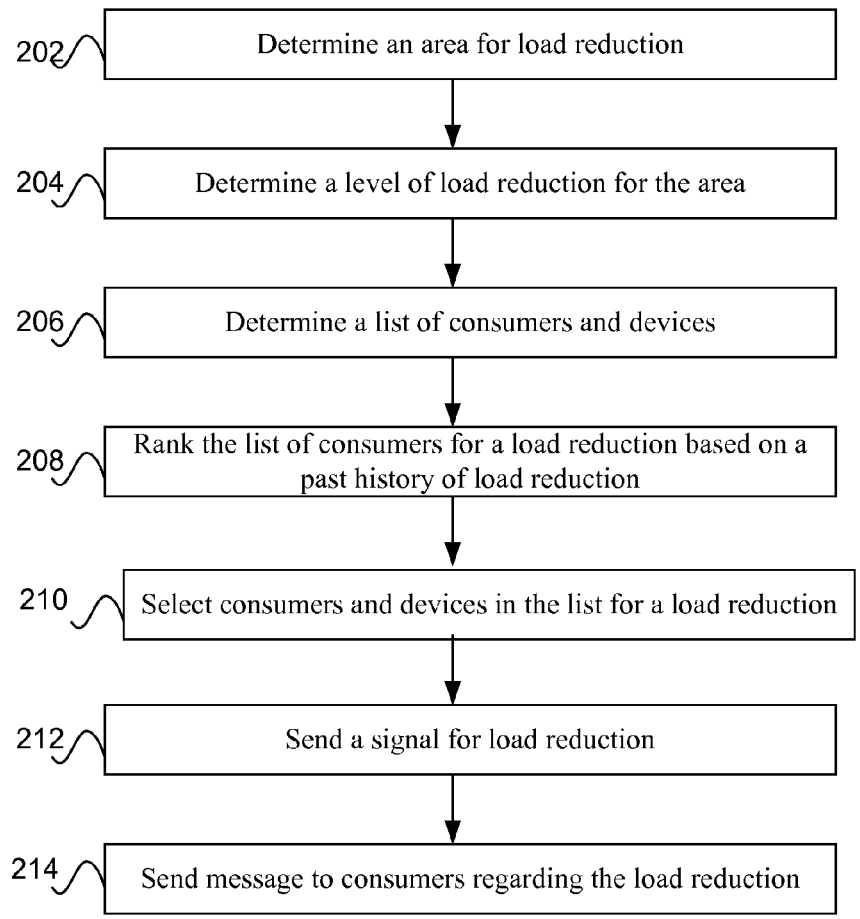
FIG. 2 depicts a simplified flowchart of a method for load reduction according to one embodiment.

FIG. 2 depicts a simplified flowchart 200 of a method for load reduction according to one embodiment. In step 202, server 102 determines an area for load reduction. For example, a utility may want to localize the demand reduction to a particular section of a grid. A grid may be an organization of homes 104 in a geographical area. For example, homes 104 may be organized in different grids or service areas. The organization may be based on ZIP codes or geographic information system (GIS) information. In one example, a section of a grid that services a certain area is determined. The area that is determined may be based on current resource usage in the area. For example, the area may be determined to be consuming more resources than desired.

In step 204, server 102 determines a level of load reduction for the area. For example, an amount of load reduction may be input by a user or may be automatically determined by server 102. The amount may be specified in units relevant to a particular resource. For example, if a reduction in electricity is desired, the amount is specified in megawatts.

In step 206, server 102 determines a list of consumers and devices 106 associated with the consumers. A consumer may be a user that is associated with home 104. Also, a consumer may be the home in which devices 106 are located and does not necessarily have to be associated with a specific user. The list of consumers is in the area that was selected in step 202.

In step 208, server 102 ranks the list of consumers for a load reduction based on a past history of load reduction. For example, consumers may be ranked based on a load reduction rating. Different factors may be used in determining the load reduction rating that will be described in more detail below.

In step 210, server 102 selects consumers and devices 106 in the list for a load reduction. For example, server 102 considers the load reduction rating in selecting consumers and/or devices 106 for a load reduction. In one example, a consumer is selected and devices associated with that consumer are added to the list. Another consumer is selected and devices associated with this consumer are added to the list. This process continues until consumers and devices are selected such that the desired load reduction is met.

In step 212, server 102 sends a signal for load reduction. For example, a signal might be sent to device controllers 108 with information on which devices 106 to power down or turn off.

In step 214, the message may be sent to consumers regarding the load reduction. For example, an end user may be sent a message that indicates certain devices 106 have been powered down or turned off. The message may be sent through any number of media, such as e-mail, short message service (SMS), automated phone call, or an in-home display.

Figure 3:
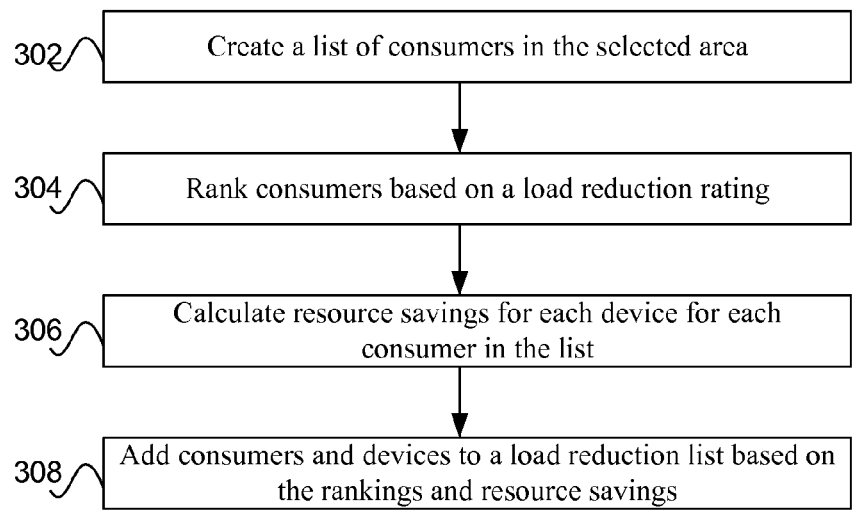
FIG. 3 depicts a simplified flowchart of a method for determining the consumers and devices based on a past history of load reductions according to one embodiment.

The following describes the determination of the list of consumers and devices 106 in more detail. FIG. 3 depicts a simplified flowchart 300 of a method for determining the consumers and devices 106 based on a past history of load reductions according to one embodiment. In step 302, server 102 creates a list of consumers in the selected area. For example, a list of consumers in the desired grid selection area is determined. This may be a list of homes 104, users, or any other entity with devices 106.

In step 304, server 102 ranks consumers based on a load reduction rating. For example, the rating may be based on statistics from past load reductions for each consumer. The statistics may include amount of load reduced (per event, as well as average; by device as well as overall for the consumer), frequency of requests sent to consumer, frequency of overrides of events by that consumer. Reduction in consumption by individual devices, as well as overall reduction, is gathered during the load reduction event and sent to a database residing on the network. The data gathered and stored can then be analyzed to determine the rating to predict the quality of response from each user and device.

Different methodologies may be used to determine the ratings. In one example, the load reduction rating is based on a number of parameters. One parameter may be how often a given consumer responds negatively to a load reduction request. Responding negatively may be when the consumer rejects the load reduction request by turning on devices 106 that were powered down or turned off. Device controller 108 may be able to detect the powering up of a device 106 after the powering down. A powering up of device 106 after a certain amount of time after the powering down may be considered a rejection of a load reduction. The load reduction rating may be inversely related to how often the given consumer responds negatively to the load reduction request. For example, when a consumer rejects the load reduction request, the load reduction rating may go down.

The load reduction rating may be on a per device level. For example, for each device 106 where the load reduction is rejected, that device's rating is affected. An overall rating for the consumer is also therefore affected.

Another parameter is an amount of load reduction the consumer provides when the load reduction request is accepted. For example, if more savings of resources is provided when the load reduction is implemented, then the load reduction rating may go up (i.e., the load reduction rating is directly related). The amount of savings may be on a per device level. For example, each device 106 may include rating. A total amount of saving for a consumer may also be used. For example, the savings for all the devices 106 may be collected and used to determine the load reduction rating for the consumer.

Another parameter is the number of requests a consumer has participated in during a certain time period. The load reduction rating may be inversely related to the number of requests. That is, the higher number of requests causes the load reduction rating to go down. The time period may be any time period, such as a recent time period (e.g., within one month). Other parameters may also be used to determine the load reduction rating. The rejection of a load reduction may be recorded on each device 106. For example, multiple devices 106 may be powered down or turned off in a load reduction. A user may only power up some of the devices powered down. Statistics on which devices 106 that are powered back up may be collected.

In step 306, server 102 calculates resource savings for each device 106 for each consumer in the list. For example, statistics may have been collected during the past history on how much resource savings were achieved when a load reduction was implemented.

In step 308, server 102 adds consumers and devices 106 to a load reduction list based on the rankings and resource savings. For example, server 102 may go down the list and add consumers and devices 106 until the desired load reduction is achieved. One method may be to take a highest-ranked consumer and add devices 106 for that consumer to the load reduction list. The amount of resource savings is added up for the devices added. A next highest consumer is then determined and devices 106 associated with this consumer are added to the load reduction list.

In one embodiment, all devices 106 associated with a consumer are added to the load reduction list. In other embodiments, only a certain number of devices 106 for a consumer would be added. For example, there may be a threshold limit on the number of devices 106 that are eligible for a load reduction request. Also, in another example, only devices 106 that in past history achieved a highest percentage of resource savings may be added to the list. For example, if any device 106 achieved a resource saving above a threshold, then those devices 106 are added to the list. The adding of consumers and devices 106 continues until the desired load reduction is achieved.

Particular embodiments dynamically create different groupings of consumers and devices 106 for a load reduction event. For example, as load reductions are performed, more statistics are collected. These statistics affect the load reduction ratings for consumers. As future load reductions occur, then different consumers may be included in the groupings for a load reduction. The consumers included may be considered the best suited for a load reduction based on the ratings. By dynamically changing the groupings based on a past history of load reductions, more efficient load reductions may be achieved because either more savings may result from devices 106 powered down or turned off or users may be less likely to reject the load reduction.

After the load reduction, particular embodiments record statistics from a load reduction. These statistics are used in determining which consumers and devices 106 to select for future load reductions as described above.

Figure 4:
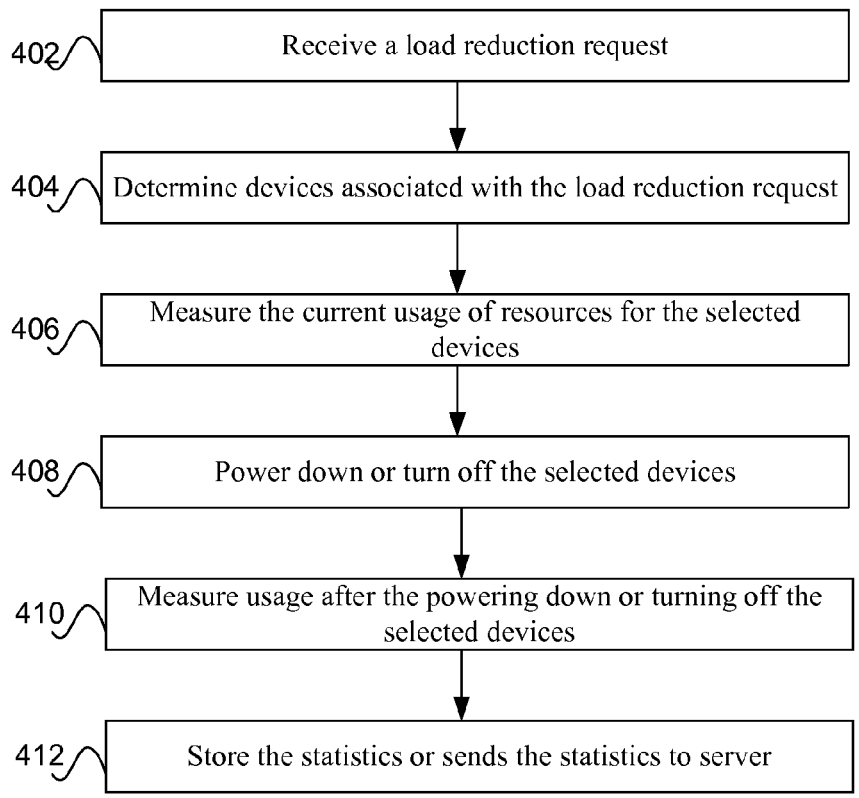
FIG. 4 depicts a simplified flowchart of a method for collecting statistics according to one embodiment.

FIG. 4 depicts a simplified flowchart 400 of a method for collecting statistics according to one embodiment. The steps described may be performed by each device controller 108 in homes 104 or by other devices, such as a smart meter. A smart meter is a device that measures resource usage for all devices 106 in home 104.

In step 402, device controller 108 receives a load reduction request. A load reduction request may be received from server 102.

In step 404, device controller 108 determines devices 106 associated with the load reduction request. For example, certain devices 106 in home 104 may be selected for the load reduction.

In step 406, device controller 108 measures the current usage of resources for the selected devices 106. The usage may be measured using any methods.

In step 408, device controller 108 powers down or turns off the selected devices 106. Any communication medium may be used to communicate with devices 106 to power down or turn them off.

In step 410, device controller 108 measures usage after the powering down or turning off the selected devices 106.

In step 412, device controller 108 stores the statistics or sends the statistics to server 102. The difference from the usage before the load reduction to the usage after the load reduction is determined as the amount of resources saved by powering down particular devices 106. Using device controller 108, specific savings for each device 106 may be determined. This allows greater granulation of statistics for determining which devices 106 to select for future load reduction requests. For example, devices 106 that provide the most savings may be selected in future load reductions.

Also, the overall usage in home 104 may also be collected. For example, device controller 108 or a smart meter may be queried to determine the overall usage in home 104. After applying the load reduction request, device controller 108 or the smart meter may be queried again to determine the overall usage after the load reduction ends. The overall savings for that consumer and for each device 106 may then be determined and sent to server 102. The overall savings for that consumer and each device 106 may then be saved and used in future load reduction requests.

Figure 5:
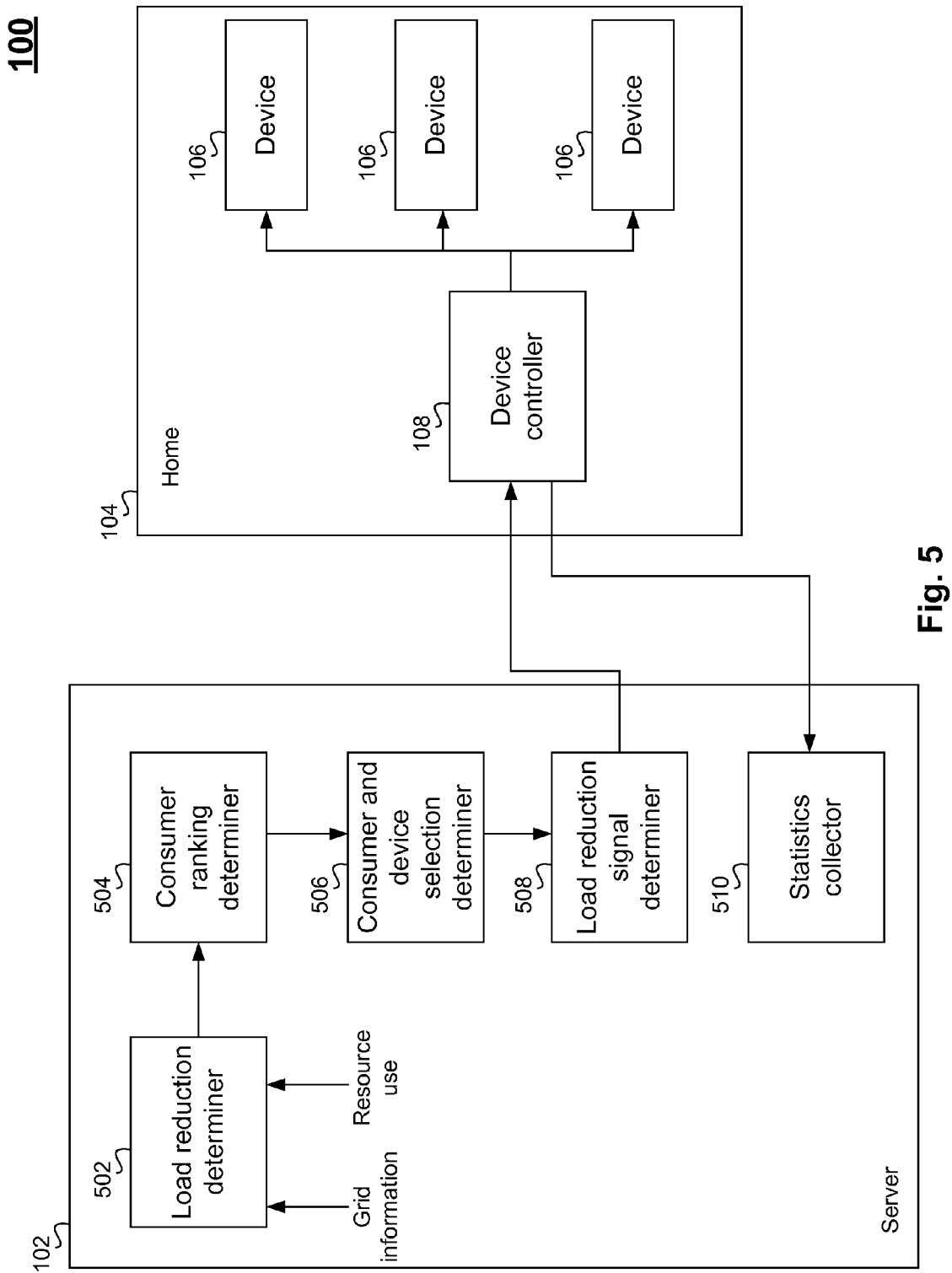
FIG. 5 depicts a more detailed example of the system according to one embodiment.

FIG. 5 depicts a more detailed example of system 100 according to one embodiment. Server 102 includes a load reduction determiner 502. Load reduction determiner 502 receives a grid and resource use for areas of the grid. An area in the grid is determined for load reduction based on the resource use.

A consumer ranking determiner 504 receives the selected area of the grid and determines a list of consumers in the area. The list of consumers may be ranked based on a past usage history. The methodologies described above may be used to rank the consumers.

A consumer and device selection determiner 506 then determines consumers and devices 106 for a load reduction. For example, consumer and device selection determiner 506 goes down the ranked list and selects consumers and devices 106 based on a criteria. A list of consumers and devices 106 is then generated.

A load reduction signal determiner 508 determines how to communicate with device controllers 108 to have the load reduction request sent for devices 106 and consumers. Any media may be used by load reduction signal determiner 508 to send the load reduction signal. Load reduction signal determiner 508 may also communicate with an end user to notify the end user of the load reduction.

In a home 104, device controller 108 receives the load reduction request signal. Device controller 108 is coupled to devices 106 and can communicate with devices 106 to power them down or turn them off.

Device controller 108 may also collect statistics about the load reduction and forward the statistics to a statistics collector 510. For example, as discussed above, the amount of resource savings that occurs because of the load reduction may be collected. Also, if an end user rejects the load reduction request by powering devices 106 back on or up, device controller 108 records this action and can forward it back to statistics collector 510. This information is used in determining the load reduction rating for future reduction requests. For example, if the load reduction request is rejected, the load reduction rating is negatively affected. However, if device controller 108 determines that the request was accepted, then the load reduction rating may be increased. Device controller 108 may determine that the load reduction request was accepted by monitoring devices 106 to see if they are powered up or turned on after a certain amount of time.

In one example, a utility company has a power plant down for maintenance. During that time the weather forecast calls for exceptionally hot weather. The utility company recognizes there will be exceptional demand and a lowered supply. In this example, the power that can be provided by the utility falls short by approximately 10 MW. Therefore the company uses particular embodiments to identify 10 MW of load and ask for a reduction during the hottest part of the day. To do this, the company first identifies the area (system wide), next the company identifies the amount of reduction (10 MW), and then a request for the reduction is sent to server 102.

Server 102 then identifies a set of devices 106 to reduce load. The 10 MW of potential load is identified based on the ratings of an owner of those devices 106 and the load used by the devices themselves. Messages are sent to the correct devices 106 requesting they reduce their load by a certain amount each. In one example, if these devices are all thermostats, the thermostats are asked to use an offset of 3 degrees from their settings. In response, all of the thermostats increase their temperatures by 3 degrees. Any owners who over-ride these settings show a reduction in their ratings, and any who do not override show an increase in their ratings.

Other examples of load reduction may also be used. One example could be turning a thermostat up by a couple of degrees on a hot day to lighten the air conditioning load. Another could be changing the cycle time for a pool pump so it cycles between on and off instead of staying continuously on. A third example could be as simple as dimming the lights by 20%

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents may be employed without departing from the scope of the invention as defined by the claims.

What is claimed is:

1. A method comprising:
   determining an area for a load reduction of resources for a first load reduction event;
   determining statistics regarding a past history of load reductions resulting from second load reduction events for a plurality of consumers in the area, wherein the second load reduction events triggered the load reduction of resources and occurred prior to the first load reduction event;
   determining individual load reduction ratings for each of the plurality of consumers based on the statistics regarding the past history of load reductions for each consumer;
   upon determining the first load reduction event, dynamically determining, using a computing device, a list of consumers and devices for the first load reduction event based on an analysis of the individual load reduction ratings for the plurality of consumers, wherein the determined devices are associated with the consumers in the list; and
   sending a signal requesting a load reduction for the determined devices for the list of consumers.

2. The method of claim 1, wherein determining the individual load reduction ratings for the plurality of consumers comprises:
   determining a list of devices associated with each consumer in the plurality of consumers;
   determining a load reduction rating for each device associated with each consumer; and
   determining an overall load reduction rating for each consumer based on the load reduction rating for each device associated with each consumer.

3. The method of claim 2, wherein determining the list of consumers and devices comprises:
   determining the list of consumers and devices based on a ranking of the overall individual load reduction ratings for each of the plurality of consumers.

4. The method of claim 1, wherein determining the list of consumers and devices comprises:
   determining a load reduction savings for devices associated with the plurality of consumers; and
   adding consumers and associated devices to the list until a desired load reduction is achieved based on the load reduction savings for devices added to the list.

5. The method of claim 1, further comprising sending a message to consumers in the list notifying the consumers of the load reduction.

6. The method of claim 1, wherein sending the signal requesting the load reduction comprises causing the devices in the list to be powered down or turned off.

7. The method of claim 1, further comprising:
   determining statistics regarding the load reduction for the determined devices during the first load reduction event; and
   storing the statistics determined during the first load reduction event for use in determining a different list of consumers and devices in a future load reduction event.

8. The method of claim 1, wherein the statistics relate to an amount of resource savings for a device when the device is powered down or turned off.

9. The method of claim 1, wherein the statistics relate to a response of a consumer to the load reduction of a device.

10. The method of claim 1, wherein the statistics include information on how the consumers responded to a load reduction request in the past history, wherein the individual load reduction rating is determined based on if a consumer responded negatively to the load reduction request by increasing a load of a device after load reduction of the device was performed.

11. The method of claim 1, wherein the statistics include information on how much load savings was provided by devices for the consumers in a load reduction request during one of the second load reduction events in the past history, wherein the individual load reduction rating for a consumer is determined based on an amount of resource savings for the consumer.

12. The method of claim 1, wherein the statistics include information on a number of load reductions applied to the consumers in the past history, wherein the individual load reduction rating is determined based on the number of load reductions applied to a consumer.

13. A method comprising:
receiving, at a device controller, a first load reduction request from a computing device for a first load reduction event, the first load reduction request for a device in communication with the device controller, wherein a consumer and the device were determined for the first load reduction request based on individual load reduction ratings for a plurality of consumers resulting from second load reduction events, and wherein the second load reduction events triggered the load reduction of resources and occurred prior to the first load reduction event;
communicating with the device to power down or turn off the device;
collecting statistics regarding resource usage for the device after the powering down or turning off of the device; and
sending the statistics to a statistics collector for use in determining consumers for a future load reduction, the statistics used to determine an individual load reduction rating for the consumer that is used to determine consumers for the future load reduction.

14. The method of claim 13, wherein collecting statistics comprises:
measuring resource usage for the device before the powering down or turning off of the device; and
measuring resource usage for the device after the powering down or turning off of the device.

15. An apparatus comprising:
one or more computer processors; and
logic encoded in a non-transitory computer readable storage medium, the logic when executed by the one or more computer processors configured to:
determine an area for a load reduction of resources for a first load reduction event;
determine statistics regarding a past history of load reductions resulting from second load reduction events for a plurality of consumers in the area, wherein the second load reduction events triggered the load reduction of resources and occurred prior to the first load reduction event;
determine individual load reduction ratings for each of the plurality of consumers based on the statistics regarding the past history of load reductions for each consumer;
upon determining the first load reduction event, dynamically determine a list of consumers and devices for the first load reduction event based on an analysis of the individual load reduction ratings for the plurality of consumers, wherein the determined devices are associated with the consumers in the list; and
send a signal requesting a load reduction for the determined devices for the list of consumers.

16. The apparatus of claim 15, wherein logic operable to determine the load reduction ratings for the plurality of consumers comprises logic operable to:
determine a list of devices associated with each consumer in the plurality of consumers;
determine a load reduction rating for each device associated with each consumer; and
determine an overall load reduction rating for each consumer based on the load reduction rating for each device associated with each consumer.

17. The apparatus of claim 16, wherein logic operable to determine the list of consumers and devices comprises logic operable to:
determine the list of consumers and devices based on a ranking of the overall load reduction ratings for the plurality of consumers.

18. The apparatus of claim 17, wherein logic operable to determining the list of consumers and devices comprises logic operable to:
determine a load reduction savings for devices associated with the plurality of consumers; and
add consumers and associated devices to the list until a desired load reduction is achieved based on the load reduction savings for devices added to the list.

19. The apparatus of claim 15, wherein the logic is further operable to send a message to consumers in the list notifying the consumers of the load reduction.

20. The apparatus of claim 15, wherein the logic is further operable to:
determine statistics regarding the load reduction for the determined devices during the first load reduction event; and
store the statistics determined during the first load reduction event for use in determining a different list of consumers and devices in a future load reduction event.

21. The method of claim 1, wherein the statistics do not include statistics when the second load reduction events are not occurring to reduce the load of resources.

22. The method of claim 13, wherein collecting the statistics comprises collecting the statistics only during the first load reduction and not after the first load reduction ends.

* * * * *